United States Patent [19]
Gibilisco

[11] Patent Number: 5,689,552
[45] Date of Patent: Nov. 18, 1997

[54] TELEPHONE CALLING WITH AUTOMATIC BILLING

[75] Inventor: Paul F. Gibilisco, Morris Township, N.J.

[73] Assignee: AT&T Corp., Middletown, N.J.

[21] Appl. No.: 115,366

[22] Filed: Aug. 31, 1993

[51] Int. Cl.$^6$ .................................................. H04M 17/00
[52] U.S. Cl. ............................................. 379/145; 379/355
[58] Field of Search ........................... 379/111, 114, 379/144, 201, 121, 216, 355, 356, 357, 88, 93

[56] References Cited

U.S. PATENT DOCUMENTS

| | | | |
|---|---|---|---|
| 4,821,309 | 4/1989 | Namekawa | 379/58 |
| 4,953,202 | 8/1990 | Newell | 379/200 |
| 5,204,894 | 4/1993 | Darden | 379/216 |
| 5,315,649 | 5/1994 | Foster et al. | 379/355 |
| 5,351,290 | 9/1994 | Naeimi et al. | 379/145 |
| 5,509,067 | 4/1996 | Murata | 379/355 |

*Primary Examiner*—Stephen Chin
*Assistant Examiner*—Kevin Kim
*Attorney, Agent, or Firm*—Barry H. Freedman

[57] ABSTRACT

AN automatic calling service is provided wherein a subscriber predefines one or more destination telephone numbers, and calls to such number or numbers are billed to the subscriber's local telephone number. Calls are made to such destination numbers through a platform that may be reached via a toll free number. The calling party identifies him/herself as a subscriber, by entering a personal identification number, to authenticate him/herself as a person entitled to make such calls. Based upon the identification provided, a determination is then made as to whether the subscriber has stored one number, or more than one number. If one number is stored, the caller need not identify the destination number, and advantageously, that number is then dialed. If more than one number has been specified, the subscriber is prompted to provide an indication of the particular number desired. The call is then completed to the desired number. In either event, the identity of the subscriber is used to assure that the call is billed to the subscriber's local telephone number. In order to reduce the possibility of unauthorized access, a determination may also be made as to whether to call is originating from an eligible location, as by checking automatic number identification (ANI) information associated with the call.

10 Claims, 4 Drawing Sheets

TELEPHONE CALLING WITH AUTOMATIC BILLING

BACKGROUND OF THE INVENTION

The present invention relates to telecommunications. A frequent complaint among callers who make calls from public telephones owned and operated by so-called alternate operator service (AOS) providers is the high rates charged for such calls as compared, for example, to the more traditional telecommunications carriers, such as the local exchange carriers (e.g., New Jersey Bell) and the so-called interexchange carriers, such as AT&T.

One response to this marketplace dissatisfaction currently deployed in the marketplace allows a caller to dial an "800", or toll-free, number which connects the caller to an operator services platform of an interexchange carrier. A live operator upon answering a call obtains the desired called number from the caller and places the call thereto on a "collect", i.e., called-party-billed, basis. This approach, while perhaps generally satisfactory, has its drawbacks in that the use of live operators is expensive. Moreover, the collect calling mechanism wherein the answering party is asked by the operator whether charges will be accepted can sometimes be less than satisfactory if, for example, a child or an answering machine answers the telephone. Moreover, the extra time required to consummate the collect calling transaction is often begrudged by callers who by their nature are impatient or are always in a hurry.

SUMMARY OF THE INVENTION

The present invention overcomes the above and other problems.

In accordance with the present invention, an automatic calling service is provided wherein a subscriber predefines one or more destination telephone numbers, and calls to such number or numbers are billed to the subscriber's local telephone number. Calls are made to such destination numbers through a platform (which includes announcement, digit collection, call completion and other telephone services functionality), that is reached via a toll free number, illustratively an 800 number. The calling party identifies him/herself as a subscriber by entering a personal identification number, or PIN, or via any other desired mechanism, such as voice recognition, to authenticate him/herself as a person entitled to make such calls. Based upon the identification provided, a determination is then made as to whether the subscriber has stored one number, or more than one number. If one number is stored, the caller need not identify the destination number, and advantageously, that number is then dialed. If more than one number has been specified, the subscriber is prompted to provide an indication of the particular number desired, which can be entered via a DTMF signal or by a voice command. The call is then completed to the desired number. In either event, the identity of the subscriber is used to assure that the call is billed to the subscriber's local telephone number. In order to reduce the possibility of unauthorized access, a determination may also be made as to whether to call is originating from an eligible location, as by checking automatic number identification (ANI) information associated with the call.

DETAILED DESCRIPTION

Figure 1:
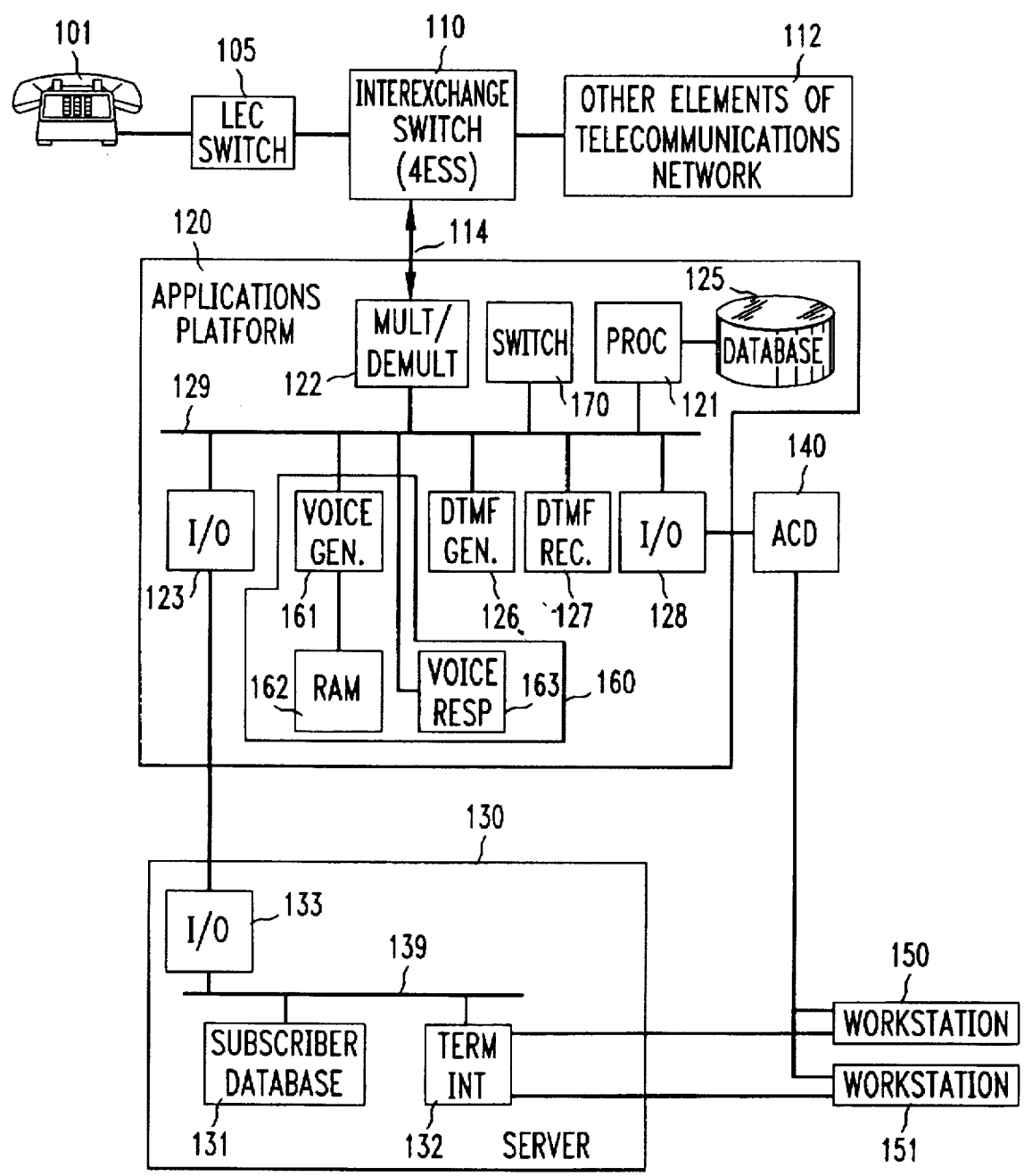
FIG. 1 is a block diagram of a system for use in a telecommunications network in which telephone calls are extended to called parties with an automatic billing feature in accordance with the present invention.

Referring first to FIG. 1, there is shown a block diagram of major components of a system arranged to implement telephone calling with automatic billing in accordance with the present invention. A subscriber utilizing the system may originate a telephone call from a telephone station 101 by dialing a predetermined toll free (e.g. "800") telephone number. The call is received in a local exchange carrier (LEC) switch 105, which recognizes that the call is a toll free call, performs a conventional database query to determine the appropriate interexchange carrier associated with the number, and extends the call to an interexchange switch 110, which, as an example, may be a 4ESS program controlled electronic switching system available from AT&T. Because of this access arrangement, the call does not require handling by an AOS.

When the call is received in interexchange switch 110, the dialed number and automatic number identification (ANI) information identifying the originating line is available. Based upon a recognition of the dialed number, the call is extended to an applications platform 120 arranged to implement the present invention. The connection between interexchange switch 110 and applications platform 120 may be established on an available circuit on a trunk 114, which may be a T1 multichannel transmission facility. A multiplexer/demultiplexer 122 may be included in applications platform 120 for the purpose of demultiplexing incoming high rate information into individual inbound calls, and for multiplexing individual outbound calls into a high rate information stream.

Applications platform 120 is arranged to perform various telephone services such as playing announcements, collecting digits, performing database operations based upon received information, and call completion. Applications platform 120 may be implemented using a CONVERSANT voice processing system available from AT&T, and includes a processor 121 and an associated database 125 which operate under the control of stored programs and together perform the process described below in conjunction with FIG. 2. Processor 121 and a series of other modules in applications platform are interconnected via a common bus 129. These modules include a dual tone multifrequency (DTMF) generator 126 and receiver 127, which are respectively arranged to generate and respond to "touch tone" signals. Applications platform 120 also includes a speech processor indicated generally at 160, which can both generate voice prompts (announcements) and respond to voice inputs. In the arrangement shown in FIG. 1, speech processor 160 includes a voice generator 161 for playing various phrases to a subscriber based upon a vocabulary stored in an associated random access memory 162, and a voice response unit 163 for receiving and interpreting speech input received from a subscriber.

Call completion is handled in applications platform 120 using a switch module 170, which is controlled by processor 121. Switch module 170 has the ability to connect incoming calls received on the various incoming circuits in trunk 114 to DTMF receiver 127, speech processor 160, or other modules. Switch module 170 also can connect or bridge incoming circuits to available outgoing circuits, so that a given incoming call can be completed to a specified destination, based upon stored information in applications platform 120. To support this capability, switch module 170 is also arranged to couple different modules in applications platform 120 (such as DTMF generator 126) to the outgoing circuits, so as to provide signaling to interexchange switch 110 and other elements in the switched telecommunications network, designated generally by numeral 112.

Applications platform 120 further includes an interface (input/output) circuit 123 which connects applications platform 120 to a server 130 containing subscriber information in a subscriber database 131, this server can be any one of several commercially available systems, such as a SUN processor running STARGROUP networking software available from AT&T. Information is communicated into and out of server 130 via another interface circuit 133, connected to a bus 139. Server 130 also includes a terminal interface circuit 132 connected to bus 139, which communicates with workstations 150–151, so that information in subscriber database 131 can be provided to attendants operating the system, and so that information can be initially loaded into subscriber records stored in subscriber database 131. Telephone calls are directed to attendants at workstations 150 and 151 through an automatic call distributor (ACD) 140, which receives its inputs from an interface (input/output) circuit 128 attached to bus 129.

Figure 2:
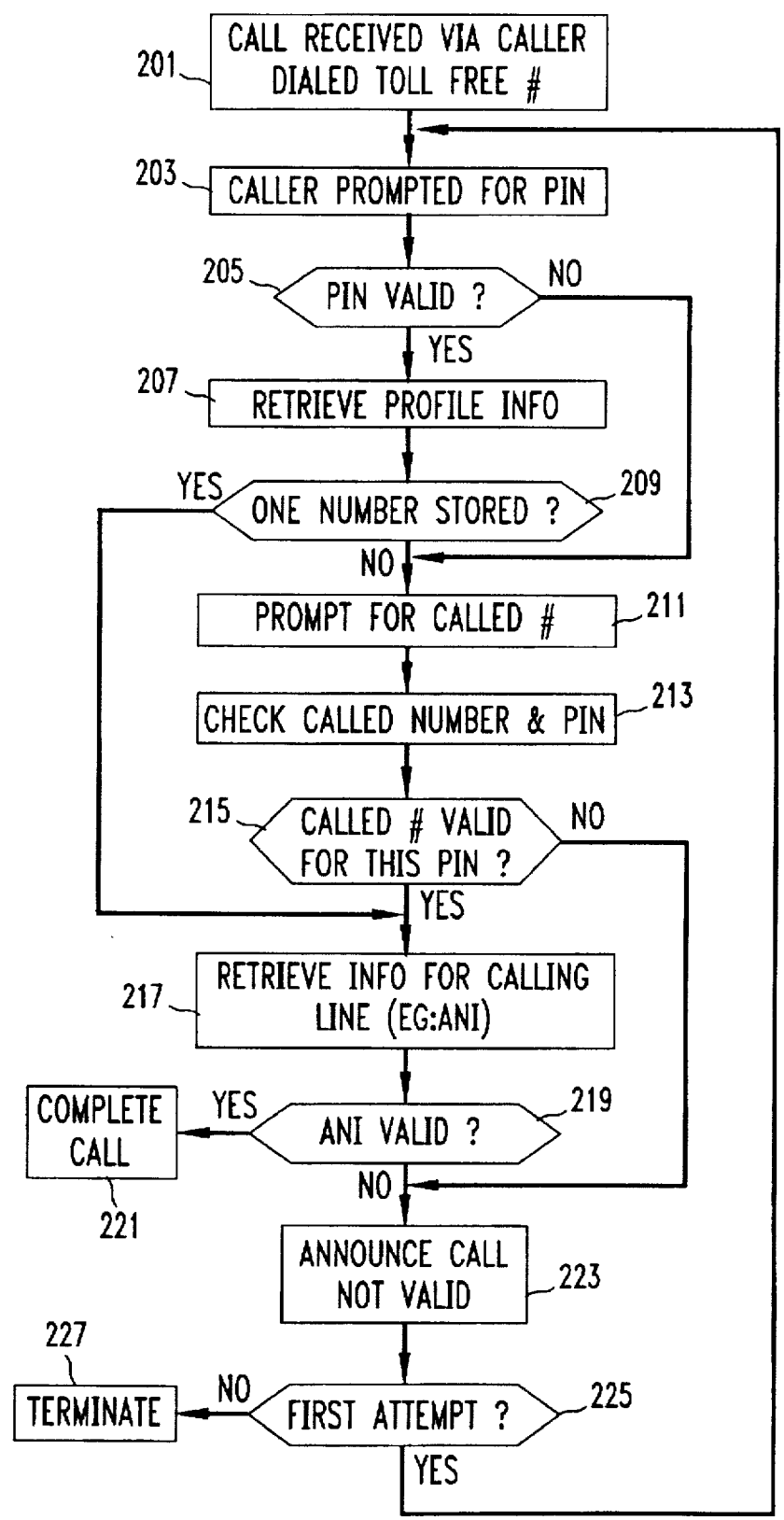
FIG. 2 is a flow diagram illustrating the steps performed in completing telephone calls with automatic billing in accordance with the present invention, using the system of FIG. 1.

Referring now to FIG. 2, there is shown a flow diagram of the process followed in implementing the present invention using the system of FIG. 1. The process begins in step 201, when a telephone call is received in interexchange switch 110 from a caller dialing a predetermined telephone number which may be an 800 number or a "local" toll-free number such as a number with the "970" exchange. Switch 110 recognizes the call as being one that is processed in accordance with the present invention, based upon the dialed number, and routes the call to applications platform 120 via an available circuit on trunk 114.

Next, in step 203, the caller is prompted to identify himself, illustratively by entering a unique personal identification number or PIN. The prompt may be generated by voice generator 161 which provides an appropriate announcement in accordance with phrases stored in RAM 162. In response to these announcements, the caller enters a PIN, which can be in the form of a series of DTMF signals generated by depressing in turn, various touch-tone keys on the caller's telephone station 101. The DTMF signal is routed by switch module 170 to DTMF receiver 127, which extracts the entered digits and transmits the information to processor 121. In step 205, a determination is made, based upon stored information in database 125, as to whether the PIN entered by the caller is valid. If it is determined in step 205 that the PIN is valid, and that the caller is thus a subscriber, information in the form of a "profile" for the subscriber, stored in database 125, is retrieved in step 207. This information indicates, in accordance with the present invention, whether the subscriber has stored one telephone that the subscriber wishes to call and to bill to his or her home telephone number, or, on the other hand, more than one telephone number that the subscriber may desire to call, and bill to a home number.

If it is determined in step 209 that only one number has been stored by the subscriber placing the call, then the system completes the call to that number in step 221, by connecting the call through switch module 170 to an available outgoing line in trunk 114, and by appropriately signaling interexchange switch 110 to route the call to the stored telephone number. However, for security purposes, it may be desirable to obtain information relating to the place of call origination. In this event, information relating to the line on which the call was originated (for example, ANI information) may be retrieved in step 217, and a determination made in step 219 as to whether, for the particular subscriber involved in the call, the ANI information represents a valid originating location. If so, call completion is permitted in step 221; otherwise, an announcement indicating failure to obtain proper authorization may be played in step 223, as described in further detail below.

If it is determined in step 209 that the calling subscriber has stored more than one possible destination telephone number, the subscriber is prompted in step 211 to enter information designating a particular stored number which the subscriber desires to reach. This information from the subscriber may be entered in the form of a DTMF sequence or by voice, and may include an abbreviated code indicative of a particular stored number, or the number itself. In either event, the information provided in response to step 211 is checked in step 213 to assure that the called number is valid for the PIN provided in response to step 203. If the result of step 215 indicates that the called number is valid, the process continues with step 217 as described above.

If it is determined in step 215 that the called number is not valid for the PIN entered in response to step 203, or if the ANI information retrieved in step 217 is determined to be invalid in step 219, an announcement may be played to the subscriber in step 223, using voice response unit 163 and phrases stored in associated RAM 162. The announcement may ask the subscriber to try again, or may provide other information to the subscriber. If the failure to provide valid information is encountered on a first attempt as determined in step 225, the process of FIG. 2 may be then repeated beginning with step 203. If multiple unsuccessful attempts occur, then the result of step 225 may be termination of the process in step 227.

If the PIN entered by the caller in response to step 203 is determined to be invalid in step 205, the caller may nevertheless be prompted for the called number in step 211. This is done for security purposes, so that the caller will not realize in step 223 that the PIN was not valid, but rather may desirably be "left in the dark" as to whether the PIN, the called number, or both, are invalid.

Figure 3:
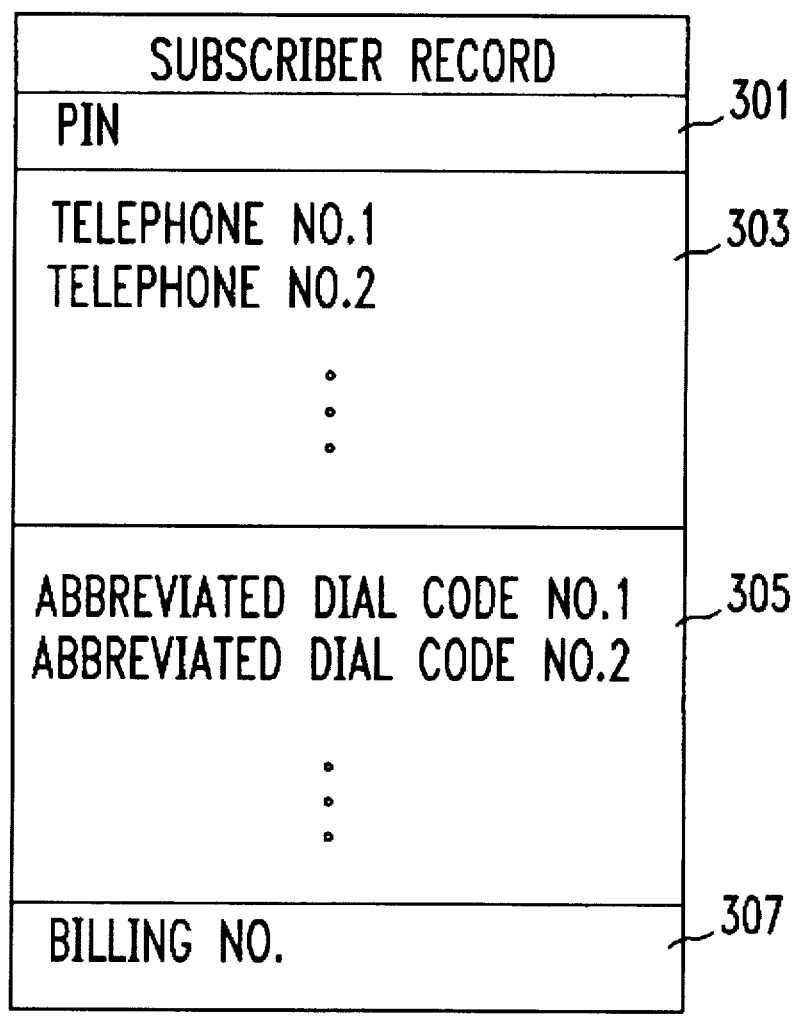
FIG. 3 illustrates the format of a typical subscriber record stored in database 125 of FIG. 1.

Referring now to FIG. 3, the format for a typical subscriber record is illustrated. In field 301 a unique PIN is stored for each subscriber. Field 303 contains one or more numbers which the subscriber desires to call which calls will be billed to the local telephone number listed in field 307. Field 305 contains abbreviated dialing codes for each of the telephone numbers listed in field 303. Accordingly, if any of the codes in field 305 are recognized, the associated called number in field 303 may be retrieved and used.

Figure 4:
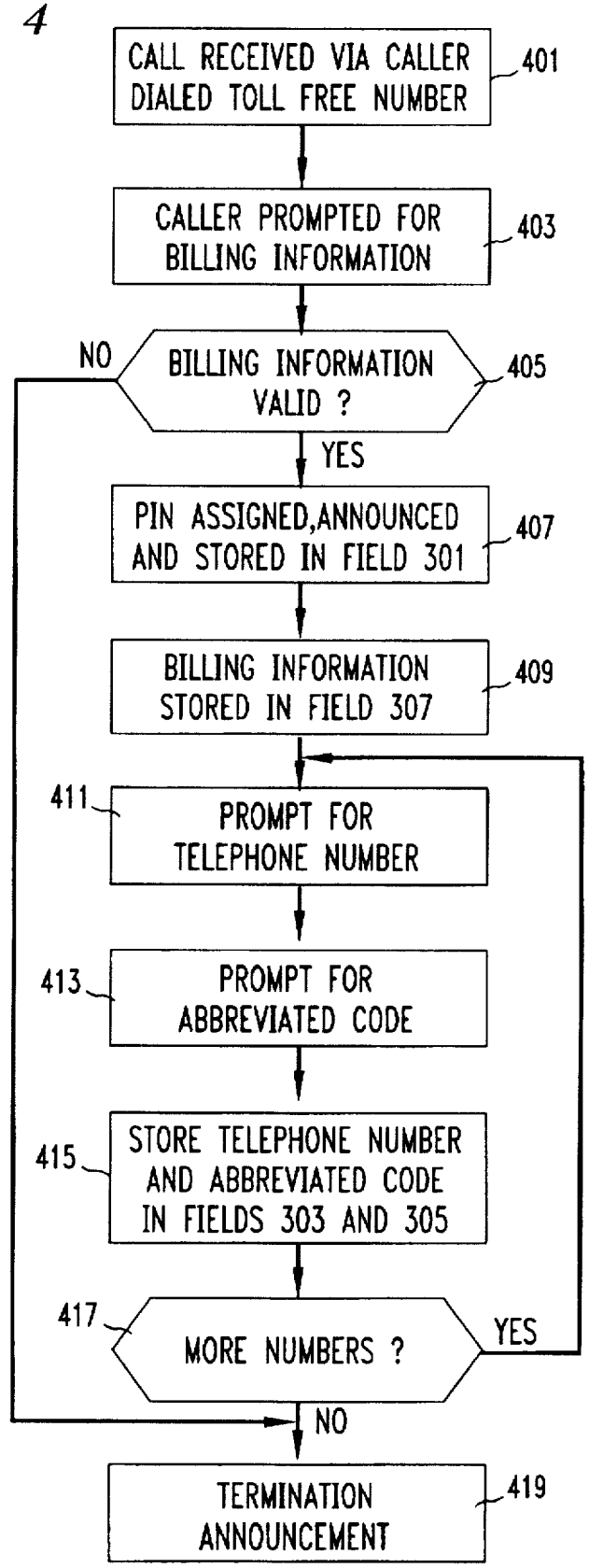
FIG. 4 illustrates the subscription on initialization process by which the information in the records of FIG. 3 is populated.

Information in the subscriber records is populated through a subscription or initialization process illustrated in FIG. 4. The process may be initiated when a caller dials a toll free telephone number in step 401 which is different from the toll free number dialed in order to initiate the calling process of FIG. 2. Alternatively, the same 800 or toll free number can be used for both purposes; in the latter event, the caller may be initially prompted to indicate whether he/she is placing a call (in which case, the process of FIG. 2 is performed) or whether he/she is subscribing (in which case, the process of FIG. 4 is performed).

In step 403, the caller is prompted to enter billing information, such as his or her home telephone number, to which charges for subsequently placed telephone calls will be applied. This billing information is validated in step 405, such as by placing a query to a remote database containing information identifying valid and invalid billing accounts. If the billing information is determined to be valid in step 405, a PIN is assigned to the caller, who now becomes a subscriber, and the PIN is stored in field 301 in the subscribers record, both in step 407. The billing information for the subscriber is stored in field 301 of the subscriber's record, in step 409.

The subscriber is next prompted for the one or more telephone numbers that the subscriber may wish to call on a collect basis, and abbreviated codes that can be used to dial those numbers, in steps 411 and 413, respectively. The numbers and abbreviated dialing codes are stored in fields 303 and 305, respectively, in step 415. After each telephone number (and abbreviated code, if applicable) is stored, a determination is made in step 417 as to whether the subscriber has any more numbers that are to be enrolled. If so, the process of steps 411–415 is repeated. When all numbers have been entered, a termination announcement is played in step 419. A different announcement may be played to the caller in step 419 if it is determined, in step 405, that the billing information provided by the caller is not, or could not be validated. At this time, the caller may be connected through to an attendant at workstations 150.

The foregoing embodiment is merely illustrative of the present invention. Persons of ordinary skill will recognize that various modifications may be made without departing from the spirit and scope of the invention.

I claim:

1. A method of automatically communicating between a subscriber and a destination via a telecommunications network, said method comprising the steps of:

storing one or more destination telephone numbers and a billing account number for each of a plurality of subscribers;

responsive to a call made to a predetermined telephone number by a caller, authenticating the identity of said caller;

determining if said caller has stored more than one destination telephone number;

if said caller is an authorized subscriber and said caller has stored only one destination telephone number, extending said call to said one destination telephone number; and performing the following steps if said one subscriber has stored more than one destination telephone number:

prompting said caller to provide an identifier uniquely associated with one of said stored destination telephone numbers, regardless of whether or not said caller is an authorized subscriber;

receiving from said caller, in response to said step of prompting, the identifier provided by said caller;

extending said call to the destination telephone number associated with the received identifier if said caller is an authorized subscriber;

announcing an error message to said caller and terminating the telephone call if said caller is not an authorized subscriber such that said caller can not determine whether said caller is unauthorized or the identifier provided by said caller is wrong.

2. The method of claim 1 wherein said billing account identifier it an individual one of the destination telephone numbers stored for said one subscriber.

3. The method of claim 1 wherein said predetermined telephone number is a toll free telephone number.

4. The method of claim 1 and further comprising the steps of:

determining the identity of the line from which said call is placed; and permitting extension of said call only if the identity of the line represents a valid originating location.

5. The method of claim 1 and further comprising the step of storing an identifier for each of said plurality subscribers, wherein said step of authenticating of said caller comprises the steps receiving an asserted identifier from a caller; and validating the caller me an individual one of said subscribers if the assorted identifier matches the stored identifier for that subscriber.

6. A method of automatically communicating between a subscriber and a destination via a telecommunications network, said method comprising the steps of:

storing one or more destination telephone numbers and a billing account number for each of a plurality of subscribers;

responsive to a call made to a predetermined telephone number by a caller, authenticating the identity of said caller;

prompting said caller to provide an identifier uniquely associated with one of said stored destination telephone numbers, regardless of whether or not said caller is an authorized subscriber;

receiving from said caller, in response to said step of prompting, the identifier provided by said caller;

extending said call to the destination telephone number associated with the received identifier if said caller is an authorized subscriber;

announcing an error message to said caller and terminating the telephone call if said caller is not an authorized subscriber such that said caller can not determine whether said caller is unauthorized or the identifier provided by said caller is wrong.

7. The method of claim 6 wherein said billing account identifier is an individual one of the destination telephone number stored for said one subscriber.

8. The method of claim 6 wherein said predetermined telephone number is a toll free telephone number.

9. The method of claim 6 and further comprising the steps of:

determining the identity of the line from which said call is placed; and permitting extension of said call only if the identity of the line represents a valid originating location.

10. The method of claim 6 and further comprising the step of storing an identifier for each of said plurality of subscribers, wherein said step of authenticating the identity of said caller comprises the steps of:

receiving an asserted identifier from a caller; and validating the caller as an individual one of said subscribers if the asserted identifier matches the stored identifier for that subscriber.

* * * * *